United States Patent Office 3,834,888
Patented Sept. 10, 1974

3,834,888
PLANT GROWTH REGULATING COMPOSITIONS COMPRISING 2 - (S,S-DIHYDROCARBYL) SULPHONIUM ETHANE PHOSPHONIC ACID COMPOUNDS AS ACTIVE COMPONENT
Edwin Francis George, Basingstoke, and Alan John Davidson, Wokingham, England, assignors to Imperial Chemical Industries Limited, London, England
No Drawing. Original application Jan. 25, 1971, Ser. No. 109,569, now Patent No. 3,711,493. Divided and this application July 20, 1972, Ser. No. 273,426
Claims priority, application Great Britain, June 10, 1970, 29,123/70
Int. Cl. A01n 9/36
U.S. Cl. 71—87         4 Claims

ABSTRACT OF THE DISCLOSURE

Process and compositions for regulating plant growth using, as the active agent, a compound of the formula

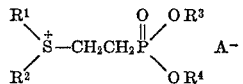

wherein $R^1$ and $R^2$ are selected from the group consisting of lower alkyl radicals, benzyl radicals and the tetramethylene radical, $R^3$ and $R^4$ are selected from hydrogen atoms, lower alkyl radicals, chloroethyl radicals, phenyl radicals and o-hydroxyphenyl radicals, and $A^-$ represents a non-phytotoxic anion. The compound can be used, for example, to promote the ripening of tomatoes or the loosening of fruit.

---

This is a division of application Ser. No. 109,569 filed Jan. 25, 1971 now U.S. Patent 3,711,493.

This invention relates to chemical compounds useful as plant growth regulating agents, to plant growth regulating compositions containing them, and to methods of regulating the growth of plants.

By the term "regulating the growth of plants" in the specification we mean affecting the metabolism of plants in such a way as to bring about an economically useful change in the behaviour of the plants.

According to the present invention there is provided a compound of the formula:

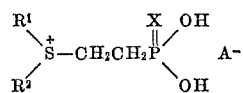

or a salt, ester, or anhydride thereof wherein X is oxygen or sulphur, the groups $R^1$ and $R^2$ are hydrocarbon radicals, optionally substituted, and $A^-$ is a non-phytotoxic anion.

The groups $R^1$ and $R^2$ may be alkyl, aryl or aralkyl.

Preferably they are alkyl radicals, having preferably 1 to 4 carbon atoms. $R^1$ and $R^2$ may be linked, e.g. so as together constitute an alkylene radical. Preferably also X is oxygen.

Suitable salts include mono salts formed for example from alkali metals or alkaline earth metals, for example sodium, potassium, or calcium salts, or from organic bases, for example mono-, di- or trialkylamines, for example such amines in which the one, two, or three alkyl radicals contain up to 4 carbon atoms, for example methylamine, diethylamine, or triethylamine.

Suitable esters include for example esters formed from an alcohol of up to 20 carbon atoms, for example methyl or ethyl esters; one or both of the hydroxyl groups of the phosphonic acid group may be esterified. Further suitable esters include cyclic esters, for example cyclic catechol esters, and esters in which a bifunctional alcohol, for example ethylene glycol, links together two phosphonic acids of the foregoing formula.

Suitable anions $A^-$ include both mono- and polyvalent anions, for example chloride, bromide, iodide and methylsulphate: any anion may be used which is not toxic to plants at the rate of application selected for use. The choice of anion is in fact simply a matter of convenience. Convenient routes presently available for making the invention compounds produce them in the form of the bromide. If for any reason this anion is not desired it can readily be exchanged for another, e.g. the methylsulphate anion, by a variety of well-known methods, for example by the use of an ion-exchange resin. Normally however there is no reason to carry out this extra step.

Examples of compounds according to the invention are given in Table I. Generally they are semisolids with no sharply defined melting point, or non-distillable oils.

The general formula of the compounds are listed in Table I.

Conveniently the compounds of the invention are applied to plants in the form of compositions, in which the active ingredient is dispersed in a carrier. The carrier may be a solid or a liquid and may additionally comprise a surface-active agent.

Solid compositions may be in the form of dusting powders or granules. Suitable solid diluents include for example kaolin, bentonite, kieselguhr, dolomite, calcium carbonate, talc, powdered magnesia, Fuller's earth and gypsum.

Solid compositions may also be in the form of dispersible powders or grains comprising, in addition to the active ingredient, a wetting agent to facilitate the dispersion of the powders or grains in liquids. Such powders or grains may include fillers, suspending agents and the like.

Liquid compositions include aqueous solutions, dispersions and emulsions containing the active ingredient, if desired in the presence of one or more surface active agents. Water or organic liquids may be used to prepare solutions, dispersions, or emulsions of the active ingredient, and aqueous solutions are particularly preferred compositions, since the compounds of our invention are mostly highly soluble in water. The liquid compositions of the invention may also contain one or more corrosion inhibitors, for example lauryl isoquinolinium bromide.

Surface-active agents, if used, may be of the cationic, anionic or non-ionic type. Suitable agents of the cationic type include for example quaternary ammonium compounds, for example cetyltrimethylammonium bromide. Suitable agents of the anionic type include for example soaps, salts of aliphatic monoesters of sulphuric acid, for example sodium lauryl sulphate; and salts of sulphonated aromatic compounds, for example sodium dodecylbenzenesulphonate, sodium, calcium, and ammonium lignosulphonate, butylnaphthalenesulphonate, and a mixture of the sodium salts of diisopropyl- and triisopropyl-naphthalenesulphonic acid. Suitable agents of the non-ionic type include, for example, the condensation products of ethylene oxide with fatty alcohols such as oleyl alcohol and cetyl alcohol, or with alkyl phenols such as octylphenol, nonylphenol, and octylcresol. Other non-ionic agents are the partial esters derived from long chain fatty acids and hexitol anhydrides, for example sorbitol monolaurate; the condensation products of the said partial esters with ethylene oxide, and the lecithins.

3,834,888

TABLE I $$\begin{matrix} R^1 \\ \phantom{R}\overset{+}{S}-CH_2CH_2\overset{O}{\underset{\|}{P}}\begin{matrix}OR^3\\OR^4\end{matrix} & Br^- \\ R^2 \end{matrix}$$

| Compound number | $R^1$ | $R^2$ | $R^3$ | $R^4$ | Physical form | Nuclear magnetic resonance spectrum in deuterium oxide | | | Prepared by method of example |
|---|---|---|---|---|---|---|---|---|---|
| 1 | $CH_3$ | $CH_3$ | H | H | M.P. 138° C | $(CH_3)_2\overset{+}{S}—$ s; τ7.0 | $>\overset{+}{S}—CH_2—$ m; τ6.2–6.7 | $—CH_2—\overset{O}{\underset{\|}{P}}<$ m; τ7.4–8.0 | 2 |
| 2 | $CH_3$ | $CH_3$ | $—C_2H_5$ | $—C_2H_5$ | M.p. 68–78° C | Same as above | Same as above | $\overset{O}{\underset{\|}{P}}\begin{matrix}OCH_2—\\OCH_2—\end{matrix}$ p; τ5.8 | $—CH_3$ t; τ8.7 | 2,3 |
| 3 | $CH_3$ | $CH_3$ | $—CH_3$ | $—CH_3$ | Semi solid | do | | $\overset{O}{\underset{\|}{P}}\begin{matrix}OCH_3\\OCH_3\end{matrix}$ d; τ6.2 | | 2,3 |
| 4 | $CH_3$ | $CH_3$ | $—CH_3$ | H | do | do | | $\overset{O}{\underset{\|}{P}}—OCH_3$ d; 6.3 | | 2,4 |
| 5 | $CH_3$ | $CH_3$ | H | $—C_6H_4OH$ (o) | do | do | | 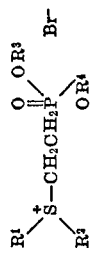 m; 2.7–2.9 | | 2 |
| 6 | $CH_3$ | $CH_3$ | H | $C_6H_5$ | do | do | | $\overset{O}{\underset{\|}{P}}—OCH_2$ m; 7.4–8.0 | m; 2.5–2.8 | 2 |
| 7 | $CH_3$ | $CH_3$ | $CH(CH_3)_2$ | H | do | Same as above | | $\overset{O}{\underset{\|}{P}}—OCH$ m; τ5.0–5.5 | $\begin{matrix}CH_3\\—OC\\\phantom{—O}CH_3\end{matrix}$ d; τ8.7 | 2 |
| 8 | $CH_3$ | $CH_3$ | $—C_2H_5$ | H | do | do | | $\overset{O}{\underset{\|}{P}}—OCH_2$ p; τ5.9 | $—CH_3$ t; τ8.7 | 2,3 |
| 9 | $CH_3$ | $CH_3$ | H | $—CH_2CH_2Cl$ | do | do | | $\overset{O}{\underset{\|}{P}}—OCH_3$ | $—CH_2Cl$ m; 6.0–6.4 | 2 |

TABLE I—Continued

| Compound number | R¹ | R² | R³ | R⁴ | Physical form | Nuclear magnetic resonance spectrum in deuterium oxide | Prepared by method of example |
|---|---|---|---|---|---|---|---|
| 10 | CH₃ | CH₃ | H | C₈H₁₇n | do | S—CH₂— m; τ6.2-6.7 ... —CH₂—P(=O) m; τ7.4-8.0 ... m; τ5.5-5.9 ... O=P(OCH)(OH) m; 5.8-6.2 ... —(CH₂)₆—CH₃ m; 8.4-9.0 t; 9.2 | 2 |
| 11 | —(CH₂)₄— | | H | | do | —CH₂—S—CH₂— m; 6.2-6.8 and —CH₂—P(=O)—CH₂— / CH₂—S⁺—CH₂ \ m; 7.4-8.0 | 2 |
| 12 | C₂H₅ | C₂H₅ | H | H | do | —CH₂—S⁺—CH₂— / —CH₂ \ m; 6.1-6.8 ... —CH₂P(=O) m; 7.4-8.0 ... CH₃— CH₃— t; 8.5 | 2 |
| 13 | —CH₂C₆H₅ | CH₃ | H | H | do | —CH₂— / S⁺— \ CH₃ s; 2.7 ... C₆H₅ s; 5.4 ... s; 6.9 ... —CH₂—P(=O) m; 6.2-6.7 ... m; 7.4-8.0 | 3 |

Note.—s=singlet; d=doublet; t=triplet; p=pentuplet; m=multiplet.

The compositions which are to be used in the form of aqueous solutions, dispersions or emulsions are generally supplied in the form of concentrates containing a high proportion of the active ingredient or ingredients, the concentrate being diluted with water before use. These concentrates are usually required to withstand storage for prolonged periods and after such storage to be capable of dilution with water in order to form aqueous preparations which remain homogeneous for a sufficient time to enable them to be applied by conventional spray equipment. In general, concentrates may conveniently contain from 10 to 85% and preferably from 25 to 60% by weight of active ingredient. Dilute preparations ready for use may contain varying amounts of the active ingredient, depending upon the purpose for which they are to be used; however, dilute preparations suitable for many uses contain between 0.01 and 10.0%, and preferably between 0.1 and 1% by weight of active ingredient.

In another aspect, the invention provides a method of regulating the growth of plants, which comprises applying to the plants, or to the locus of the plants, a compound of the foregoing formula.

The rate of application of the compound will depend upon a number of factors, for example, the particular plant species to be treated, and the particular compound chosen for use. In general, however, a rate of application of from 0.1 pound per acre to 20 pounds per acre is suitable. A preferred rate of application is from 0.5 to 4 pounds per acre.

The useful effects brought about by applying the compounds of the invention to plants include the accelerated ripening of fruits e.g. olives and coffee berries; the degreening of citrus fruits; the acceleration of abscission; the retardation of growth and "dwarfing" of plants; the breaking of dormancy in buds, shoots, tubers, corms and rhizomes; improving germination and after-ripening of certain seeds; altering the sex ratio of flowers in certain plants, e.g. cucurbits; and stimulating the flowering of some plants, for example pineapples.

The compounds can also be used to stimulate the flow of latex tapped from rubber trees. For this purpose the compounds are applied to the bark of the rubber tree near the cut which is made to tap the latex.

In a further aspect the invention provides processes for the preparation of the foregoing compounds.

In one process, a 2-halogenoethylphosphonic or thiophosphonic acid or ester is reacted with a dihydrocarbyl sulphide according to the scheme below:

A
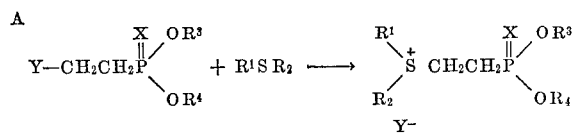

In the foregoing scheme, Y represents chlorine, bromine, or iodine, $R^1$ and $R^2$ represent hydrocarbyl radicals, $R^3$ and $R^4$ represent hydrogen or hydrocarbyl and X is oxygen or sulphur. The anion $Y^-$ may be exchanged for some other anion if desired, by means well known to those skilled in the art, for example by use of ion-exchange resins. This process is illustrated in Example 2.

In another process, a 2-halogenoethylphosphonic acid or ester is reacted with an alkali metal hydrocarbyl sulphide to give a 2-hydrocarbylthioethyl phosphonic acid or ester.

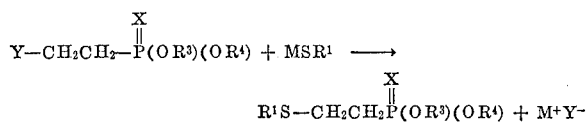

In the second stage the product of this reaction is reacted with a hydrocarbyl halide, preferably a bromide.

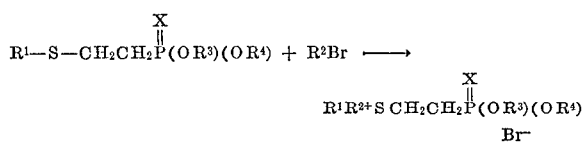

This process is illustrated in Example 3 hereinafter.

In a third process a hydrocarbylthioethyl phosphonic or thiophosphonic acid diester is reacted with hydrogen bromide to give a 2-dihydrocarbyl sulphonioethyl phosphonic acid bromide half ester.

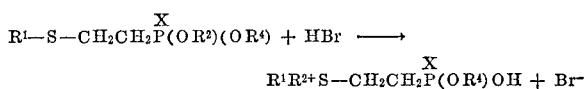

This process is illustrated in Example 4. It must be conducted at moderate temperatures, i.e. below 50° C. and preferably at from 35° C. to room temperature. At higher temperatures, for example if the reaction mixture is heated under reflux, the product obtained is the hydrocarbyl thioethyl phosphonic or thiophosphonic half ester, or, if excess hydrobromic acid is used, the free acid.

A fourth process is represented by the following scheme.

B
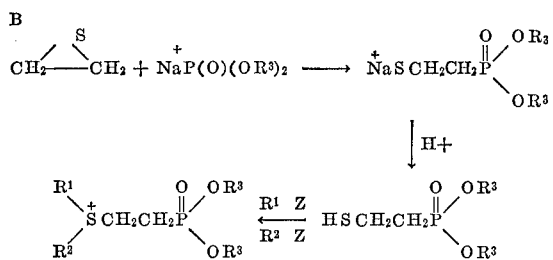

In Scheme B, the symbols $R^1$, $R^2$ and $R^3$ represent alkyl radicals, while Z represents the anion of a strong acid, for example chloride bromide or methosulphate. A drawback of this process is that it gives very poor yields.

The compounds and processes of the invention are illustrated by the following Examples in which all proportions are by weight except where otherwise stated.

EXAMPLE 1

This Example illustrates the preparation of 2-dimethylsulphonioethylphosphonic acid bromide (compound No. 1 of Table I) 2-Bromoethanephosphonic acid (0.80 g., 0.004 M) and dimethyl sulphide (5.0 g., 0.080 M) were heated under reflux for 6 days. The excess of dimethyl sulphide was evaporated to yield the product as a viscous oil. ($C_4H_{12}BrPSO_3$ requires: Br, 31.9%; found Br 31.6%).

EXAMPLE 2

This illustrates an alternative method of preparation of Compound No. 1 of Table I.

2-Bromoethylphosphonic acid (18.9 g., 0.1 M) and dimethyl sulphide (6.2 g., 0.1 M) were dissolved in a mixture of methanol (3.8 g.) and water (6.6 g.) and left to stand for 6 days at room temperature. Solvents were removed at 45° under reduced pressure and the residue was dried in vacuo to give a colourless oil. This was repeatedly extracted with dry ether to leave 2-dimethylsulphonioethylphosphonic acid bromide as a white crystalline solid (yield 8.4 g.; 33%) mp 133–6° ($C_4H_{12}BrPSO_3$ requires C, 19.1; H, 4.8; P 12.4; ionic Br, 31.9; total Br, 31.9%. Found C, 19.3; H, 5.3; P, 12.8; ionic Br, 33.2; total Br 32.3%).

EXAMPLE 3

This example illustrates the preparation of 2-dimethylsulphonioethylphosphonic acid bromide, dimethyl ester (compound No. 3 of Table I) in a two stage process.

(a) Preparation of 2-Methylthioethane phosphonate, dimethyl ester

A solution of sodium ethoxide in ethanol from sodium (12.7 g.) and dry ethanol (600 ml.), was cooled to 0° and allowed to react with an excess of methane thiol for 10 minutes. On warming to room temperature, unreacted methane thiol distilled off. Addition of 2-bromoethyl dimethylphosphonate (95 g.) to the cooled solution resulted in a rapid exothermic reaction which immediately began to deposit sodium bromide as a dense white precipitate. The reaction was stirred for 18 hours at room temperature, the solution filtered and the filtrate evaporated to give a white viscous paste containing a large amount of inorganic material. 2-Methylthioethyl dimethylphosphonate (72 g., 89%) was isolated as a mobile oil by extraction into dry ether and evaporation of the solvent.

(b) Preparation of 2-dimethylsulphonioethyl phosphonic acid bromide, dimethyl ester Methyl bromide (25 ml.) was reacted with 2-methylthioethyl dimethylphosphonate (6 g.) at 4.5° for 18 hours giving the corresponding dimethylsulphonium salt, as a white semi-solid, in 92% yield.

EXAMPLE 4

This Example illustrates the preparation of methyl hydrogen 2-dimethylsulphonioethyl phosphonate bromide (compound No. 4 of Table I). Dimethyl 2-methylthioethylphosphonate (7.6 g., 0.04M) and 46% hydrobromic acid (7.8 g., 0.04M) were stirred together for 6 hours at 35°. Water was removed at 45° under reduced pressure and the residue was dried in vacuo over potassium hydroxide. The remaining oil was extracted repeatedly with dry ether to leave methyl hydrogen 2-dimethylsulphonioethylphosphonate bromide as a white semi-solid (yield 6.0 g., 55%).

EXAMPLE 5

This Example shows the biological activity of compounds according to the invention.

Tomato plants growing in potting compost were sprayed when approximately 4" high with a 0.5% w./v. aqueous solutions of Compounds 1, and 3–12.

The solutions also contained 0.05 percent by weight of a surface-active agent sold under the name of "Lissapol NX" ("Lissapol" is a Registered Trade Mark for a surface-active agent comprising a condensate of ethylene oxide with p-nonyl phenol). Two days after spraying, the leaves of all treated plants were found to be epinastic, whereas plants sprayed with 0.05 percent Lissapol NX or untreated, showed no such effect.

EXAMPLE 6

This Example illustrates the abscission of leaf petioles in Coleus plants induced by application of a compound according to the invention.

Coleus plants were grown in 3 inch pots of compost until approximately six inches high. Some of the leaf blades were then removed leaving petiole stumps (approximately ½–¾ inch in length) attached to the main stem. The plants were than sprayed with a 0.5 percent w./v. aqueous solution of 2-dimethylsulphonioethylphosphonic acid bromide (compounds No. 1 of Table I) containing 0.05 percent of Lissapol NX. Two days after treatment the number of debladed petioles which had fallen off the stem of treated and untreated plants was counted with the following results:

Percent petioles abscissed
Plants treated with 2-dimethylsulphonioethylphosphonic acid bromide _____ 87.5
Control, untreated plants _____ 37.5

EXAMPLE 7

This Example illustrates the use of compounds of the invention in loosening citrus fruit.

Tests were conducted on miniature orange trees (Calamondins-*Citrus mitis*) grown in the green house. Ten ripe fruits were painted with each test solution and attachment forces measured six days after treatment. The test solutions consisted of water, and invention compound and 0.1% Lissapol NX wetter.

| Compound number (Table I) | Concentration (p.p.m.) | Mean pull force (kg.) |
|---|---|---|
| 1 | 3,000 | 1.31 |
| 2 | 3,650 | 1.29 |
| 3 | 3,350 | 1.30 |
| 8 | 3,350 | 1.49 |
| Control | | 1.89 |

EXAMPLE 8

This Example illustrates the use of compounds of the invention in loosening oranges, variety 'Salustiana' in Spain.

Thirty ripe oranges (7 or 8 from each of 4 trees) were painted with an aqueous solution of a compound of the invention. Each solution also contained 0.1 percent of the wetting agent Lissapol NX. Eight days after application of the compound, the thirty treated fruits were pulled from the tree using a push-pull guage which measured the force necessary to separate the fruit from the fruit pedicel. In a control experiment, using 60 oranges from eight trees, the treatment used was an aqueous solutions containing 0.1% Lissapol NX, only. Results are given below.

| Compound number (5Table I) | Concentration (p.p.m.) | Mean pull force necessary to remove fruits Kg. | Reduction in force (kg.) relative to control |
|---|---|---|---|
| 1 | 500 | 6.46 | 2.08 |
|   | 2,000 | 6.31 | 2.23 |
| 4 | 500 | 6.41 | 2.13 |
|   | 2,000 | 7.25 | 1.29 |
| 8 | 500 | 7.28 | 1.26 |
|   | 2,000 | 5.11 | 3.43 |
| 9 | 500 | 7.38 | 1.16 |
|   | 2,000 | 7.50 | 1.04 |
| 3 | 500 | 7.35 | 1.19 |
|   | 2,000 | 6.36 | 2.18 |
| 2 | 500 | 5.15 | 3.39 |
|   | 2,000 | 5.95 | 2.59 |
| 6 | 500 | 7.61 | 0.93 |
|   | 2,000 | 6.28 | 2.26 |
| 10 | 500 | 6.05 | 2.49 |
|   | 2,000 | 3.36 | 5.18 |
| 7 | 500 | 6.15 | 2.39 |
|   | 2,000 | 5.66 | 2.88 |
| Control |   | 8.54 |   |

EXAMPLE 9

This Example illustrates the use of compounds of the invention in loosening blackcurrants.

Blackcurrant bushes in a Sussex orchard were sprayed overall with aqueous solutions of the invention compounds containing 0.1% Lissapol NX wetter. The bushes were gently shaken 5 days after spraying, and the percentages of fruit and leaf drop were assessed visually. Results are given below.

| Compound number (Table I) | Concentration (p.p.m.) | Fruit drop (percent) | Leaf drop (percent) |
|---|---|---|---|
| 4 | 5,000 | 70 | 5 |
|   | 2,000 | 50 | 5 |
| 3 | 5,000 | 50 | 5 |
|   | 2,000 | 40 | 5 |
| 1 | 5,000 | 80 | 5 |
|   | 2,000 | 80 | 5 |
| Control |   | 1 | 5 |

EXAMPLE 10

This Example illustrates the use of compounds of the invention in loosening top fruit.

Compounds of the invention were applied to apples growing in a Sussex orchard by selecting one main branch per treatment, bearing about 20 fruits, and painting the aqueous solutions containing 0.1% Lissapol NX wetter onto the fruit surface with a paint brush.

The number of apples per treatment was recorded at the time of application and the force necessary to remove each apple still attached six days later was measured with a push-pull gauge. Results are given below.

| Compound number (Table I) | Mean force (kg.) required to remove fruit at indicated application rate of chemical | | |
|---|---|---|---|
|   | 5,000 p.p.m. | 2,000 p.p.m. | 500 p.p.m. |
| 1 | 0.74 | 0.89 | 1.18 |
| 8 | 0.16 | 0.93 | 0.91 |
| 4 | 0.95 | 1.06 | 1.02 |
| 6 | 1.53 | 0.95 | 0.89 |
| 9 | 1.06 | 1.22 | 1.30 |
| Control |   | 1.48 |   |

EXAMPLE 11

This Example illustrates the use of compounds of the invention to increase the proportion of female flowers in cucurbit plants, thereby increasing the fruit bearing potential of the plants.

Cucumber plants (*Cucumis sativus*, variety Suttons Improved Telegraph) were sprayed with aqueous solutions of the invention compounds at the stage of growth in which two leaves are fully expanded and the third leaf is half expanded. The concentration of the invention compounds was 1000 p.p.m. There were four replicate plants per treatment. The plants were grown on to maturity and the number of male and female flowers counted. Results are given below.

| Compound numbers (Table I) | Percent male flowers | Percent female flowers |
|---|---|---|
| 3 | 55.9 | 44.1 |
| 8 | 80.8 | 19.2 |
| Control | 89.8 | 10.5 |

EXAMPLE 12

This Example illustrates the use of compounds of the present invention in ripening tomatoes.

Tomatoes (*Lycopersicon esculentum*) of an Italian canning variety were grown in the field in Valencia, Spain. Seven days before harvest they were sprayed with aqueous solutions of the invention compounds containing 0.1% 'Lissapol' NX wetter. Assessments of ripeness were then made 3 days later, and again seven days later, just after harvest. Tomatoes were classified visually as red, pink/red, pink or green/pink and a ripeness index calculated as follows Ripeness index=percent red fruits+0.75 (percent pink/red fruits)+0.5 (percent pink fruits)+0.25 (percent green/pink fruit).

The table below gives the percentage increase in ripeness index over untreated controls at the same stage of development. It should be noted that the 3 day assessment is inherently less accurate than the seven day assessment because the fruits are not removed from the plant.

| Compound number (Table I) | Concentration (p.p.m.) | Percent increase in ripeness index after— 3 days | 7 days (harvest) |
|---|---|---|---|
| 1 | 1,000 | 8.5 | 8.7 |
| 3 | 5,000 |  | 5.6 |
|  | 2,000 |  | 4.0 |
| 4 | 2,000 | 11.5 | 11.5 |
|  | 1,000 | 6.5 | 6.5 |
| 8 | 1,000 | 4.5 | 4.1 |
| 7 | 2,000 | 8.0 | 8.1 |
|  | 1,000 | 4.5 | 1.5 |
| 9 | 2,000 | 13.5 | 6.1 |
|  | 1,000 | 11.0 | 2.8 |
| 10 | 2,000 | 9.5 | 6.2 |
|  | 1,000 | 2.0 | 1.6 |

What is claimed is:

1. The process which comprises applying a compound of the formula

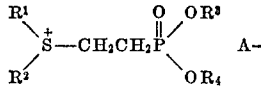

wherein $R^1$ and $R^2$ are selected from the group consisting of lower alkyl radicals, benzyl radicals and the tetramethylene radical, $R^3$ and $R^4$ are selected from hydrogen atoms, lower alkyl radicals, chloroethyl radicals, phenyl radicals and O-hydroxyphenyl radicals, and $A^-$ represents a non-phytotoxic anion, to tomatoes in such amount as to promote ripening of said tomatoes.

2. A process which comprises applying a compound of the formula

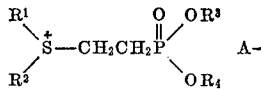

wherein $R^1$ and $R^2$ are selected from the group consisting of lower alkyl radicals, benzyl radicals and the tetramethylene radical, $R^3$ and $R^4$ are selected from hydrogen atoms, lower alkyl radicals, chloroethyl radicals, phenyl radicals and O-hydroxyphenyl radicals, and $A^-$ represents a non-phytotoxic anion, to fruit in such an amount as to promote loosening of said fruit.

3. A process according to claim 2 wherein said fruit is citrus.

4. A process which comprises applying a compound of of the formula

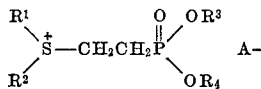

wherein $R^1$ and $R^2$ are selected from the group consisting of lower alkyl radicals, benzyl radicals and the tetramethylene radical, $R^3$ and $R^4$ are selected from hydrogen atoms, lower alkyl radicals, chloroethyl radicals, phenyl radicals and O-hydroxyphenyl radicals, and $A^-$ represents a non-phytotoxis anion, to cucurbits in such an amount as to promote the formation of an increased proportion of female flowers thereon.

References Cited

UNITED STATES PATENTS 3,725,466  4/1973  Uhing _____ 71—87

JAMES O. THOMAS, JR., Primary Examiner

U.S. Cl. X.R.

71—71, 72, 76, 77

UNITED STATES PATENT OFFICE
CERTIFICATE OF CORRECTION

Patent No. 3,834,888　　　　　　　　Dated September 10, 1974

Inventor(s) Edwin Francis George and Alan John Davidson

It is certified that error appears in the above-identified patent and that said Letters Patent are hereby corrected as shown below:

In the heading of the patent, the priority data should read as follows:

--Claims priority, application Great Britain, February 10, 1970, 6403/70 and Great Britain, June 16, 1970, 29123/70--

Signed and sealed this 15th day of April 1975.

(SEAL)
Attest:

RUTH C. MASON
Attesting Officer

C. MARSHALL DANN
Commissioner of Patents
and Trademarks